United States Patent [19]
Winter et al.

[11] Patent Number: 5,647,876
[45] Date of Patent: Jul. 15, 1997

[54] METHOD OF REMOVING VOLATILE METALS FROM SLAG USING AN ACID WASH

[75] Inventors: John Duckett Winter, Yorba Linda; John Saunders Stevenson, San Pedro; Jerrold Samuel Kassman, Long Beach; Harry Clarence Wiese, Whittier; George Neal Richter, San Marino, all of Calif.; Lisa Marie Kocsis, Allen, Tex.; Rinaldo Ibbarola Salvaleon, Ontario, Calif.

[73] Assignee: Texaco Inc., White Plains, N.Y.

[21] Appl. No.: 533,703

[22] Filed: Sep. 26, 1995

[51] Int. Cl.$^6$ .................................................. C22B 7/04
[52] U.S. Cl. ........................... 48/197 R; 75/419; 75/743; 205/771; 48/DIG. 1; 48/DIG. 2
[58] Field of Search ...................... 48/197 R, DIG. 1, 48/DIG. 2; 205/771; 75/419, 743

[56] References Cited

U.S. PATENT DOCUMENTS 3,971,652 7/1976 Bryson ........................................ 75/743
4,705,537 11/1987 Yaghmaie et al. ..................... 48/197 R
5,344,479 9/1994 Kerfoot et al. ............................ 75/743

*Primary Examiner*—Timothy McMahon
*Attorney, Agent, or Firm*—Henry H. Gibson

[57] ABSTRACT

A method is disclosed for recovering condensed solidified volatile metals from the slag that exits the reactor section of a partial oxidation reactor. In a partial oxidation reactor, condensed solidified volatile metals become adsorbed to the surface of the slag particles and other particulate matter associated with the gasification reaction, such as ash and soot. These particulate materials can be removed and recovered. Finely divided slag particles can be separated and contacted with a mineral acid to dissolve the adsorbed condensed volatile metals. An acid liquor results which contains dissolved volatile metal salts of the acid. The acid liquor containing the dissolved volatile metal acid salts is then electrolyzed to reduce the dissolved volatile metal acid salts to the corresponding elemental metal for recovery.

16 Claims, 2 Drawing Sheets

METHOD OF REMOVING VOLATILE METALS FROM SLAG USING AN ACID WASH

BACKGROUND OF THE INVENTION

1. Field of the Invention

This invention relates to a method for removing volatile metals from slag using an acid wash.

2. Description of the Prior Art

Ash-containing feedstocks such as petroleum coke, coal, residual fuel oils or other contaminated hydrocarbonaceous materials that undergo partial oxidation in a partial oxidation reactor frequently produce a slag byproduct.

A typical charge to a partial oxidation reactor includes the feedstock, a free-oxygen containing gas and any other materials that may enter the burner located in the reactor inlet.

As noted herein, the partial oxidation reactor can also be referred to as a "partial oxidation gasifier reactor", "gasification reactor", or simply a "reactor" or "gasifier," and these terms are often used interchangeably.

Partial oxidation reactors are well known in the art, as are the partial oxidation reaction conditions. See, for example, U.S. Pat. Nos. 4,328,006 and 4,328,008, both to Muenger, et al., U.S. Pat. No. 2,928,460 to Eastman, et al., U.S. Pat. No. 4,872,886 to Henley et al., U.S. Pat. No. 4,760,667 to Eckstein et al., U.S. Pat. No. 4,823,741 to Davis et al., U.S. Pat. No. 4,889,540 to Segerstrom et al., U.S. Pat. Nos. 4,959,080 and 4,979,964, both to Sternling, and U.S. Pat. No. 5,281,243 to Leininger.

The partial oxidation reaction is conducted under reaction conditions that are sufficient to convert a desired amount of ash-containing feedstock to synthesis gas or "syngas". Non-gaseous byproducts include slag and other materials, such as char, fine carbon particles, and inorganic ash. The slag and inorganic ash is frequently composed of metals such as iron, sodium, potassium, aluminum, calcium, silicon, and the oxides and sulfides of these metals, much of which is entrained in the syngas product stream.

Reaction temperatures typically range from about 900° C. to about 2,000° C., preferably from about 1,200° C. to about 1,500° C. Pressures typically range from about 1 to about 250 atmospheres, preferably from about 15 to about 200 atmospheres. The average space velocity in the partial oxidation reaction zone generally ranges from about 0.5 to 0.05 seconds$^{-1}$, and normally from about 0.3 to about 0.1 seconds$^{-1}$.

The syngas product composition will vary depending upon the composition of the feedstock and the reaction conditions and generally includes CO, $H_2$, steam, $CO_2$, $H_2S$, COS, $CH_4$, $NH_3$, $N_2$, and, if present in the feed to the partial oxidation reactor at high enough concentrations, less readily oxidizable volatile metals, such as lead, zinc, and cadmium.

Slag is essentially fused mineral matter, such as ash, and can also include other carbonaceous materials, such as soot or char. Slag materials also include the oxides and sulfides of transition metals such as vanadium, molybdenum, chromium, tungsten, manganese, and palladium, which can be recovered as valuable byproducts of the slag.

Most inorganic components of gasifier feeds can form slag, which when cooled is a vitreous solid composed of these constituents and mixtures of these constituents and their oxides and sulfides. Such slag-forming elements, also referred to as "slagging elements", include transition metals, such as vanadium, iron, nickel, tantalum, tungsten, chromium, manganese, zinc, cadmium, molybdenum, copper, cobalt, platinum, palladium; alkali and alkaline earth metals, such as sodium, potassium, magnesium, calcium, strontium, or barium; and others including aluminum, silicon, phosphorus, germanium, gallium, and the like. The amount of slagging elements in the feedstock generally varies from about 0.01 to about 50 weight %.

Under the conditions in the gasification reactor, depending on the chemical form and physical characteristics, some metals are non-volatile and others are volatile. The most common non-volatile metals, or metals that form non-volatile compounds, such as oxides under gasifier conditions, include iron, sodium, potassium, aluminum, calcium and silicon, most of which become incorporated in the vitreous slag.

The term "incorporation" as used herein means the ability of certain elements and/or compounds to become chemically or physically bound within the slag, thereby becoming resistant to leaching from the slag.

For purposes of this invention, the term "slag" is also used to collectively refer to inorganic ash and other particulate materials which occur as a result of gasification reactions.

The molten slag produced in partial oxidation reactors can be removed from the process in two ways:

1) In the quench mode of operation, the products of the gasification reactions are cooled by being passed through a pool of water in a quench chamber immediately below the gasifier. Slag is cooled and collects in this quench chamber, from which it and other particulate materials that accumulate in the quench chamber can be discharged from the gasification process by use of a lockhopper or other suitable means. The syngas exiting the quench chamber is passed through an aqueous scrubber for further removal of particulates before further processing.

2) In some applications it is beneficial to recover heat from the hot partial oxidation products. This can be done using a waste heat boiler in which the high temperature syngas and slag are cooled indirectly with water to produce high pressure steam. In this mode of operation, the slag can pass into a pool of water in the bottom of the waste heat boiler where it is cooled and collected, while the gases are removed without water quenching for further cooling and water scrubbing for particulate removal as in the quench mode.

SUMMARY OF THE INVENTION

The present invention relates to a method for recovering condensed solidified volatile metals from the reaction products that exit the reactor section of a partial oxidation reactor. In a partial oxidation reactor equipped with a quench chamber, condensed solidified volatile metals, or their salts, become adsorbed to the surface of the slag particles and other particulate matter associated with the gasification reaction, such as ash and soot. These materials can then be removed and recovered from the quench chamber and any subsequent scrubbing operation.

Condensed solidified volatile metals can also be recovered from the slag and inorganic ash particles that exit a syngas partial oxidation reactor that is not equipped with a quench chamber. In this case, the volatile metals can be recovered from the slag, inorganic ash, soot, or char recovered from the pool of water at the bottom of the waste heat boiler, and from any subsequent scrubbing operation.

The finely divided slag particles can then be separated from the process water and contacted with a mineral acid to dissolve the adsorbed condensed volatile metals and form dissolved volatile metal salts of the acid in the resulting acid liquor. The acid liquor containing the dissolved volatile metal acid salts is then electrolyzed to reduce the dissolved volatile metal acid salts to the corresponding elemental metal for recovery.

DESCRIPTION OF THE PREFERRED EMBODIMENTS

Figure 1:
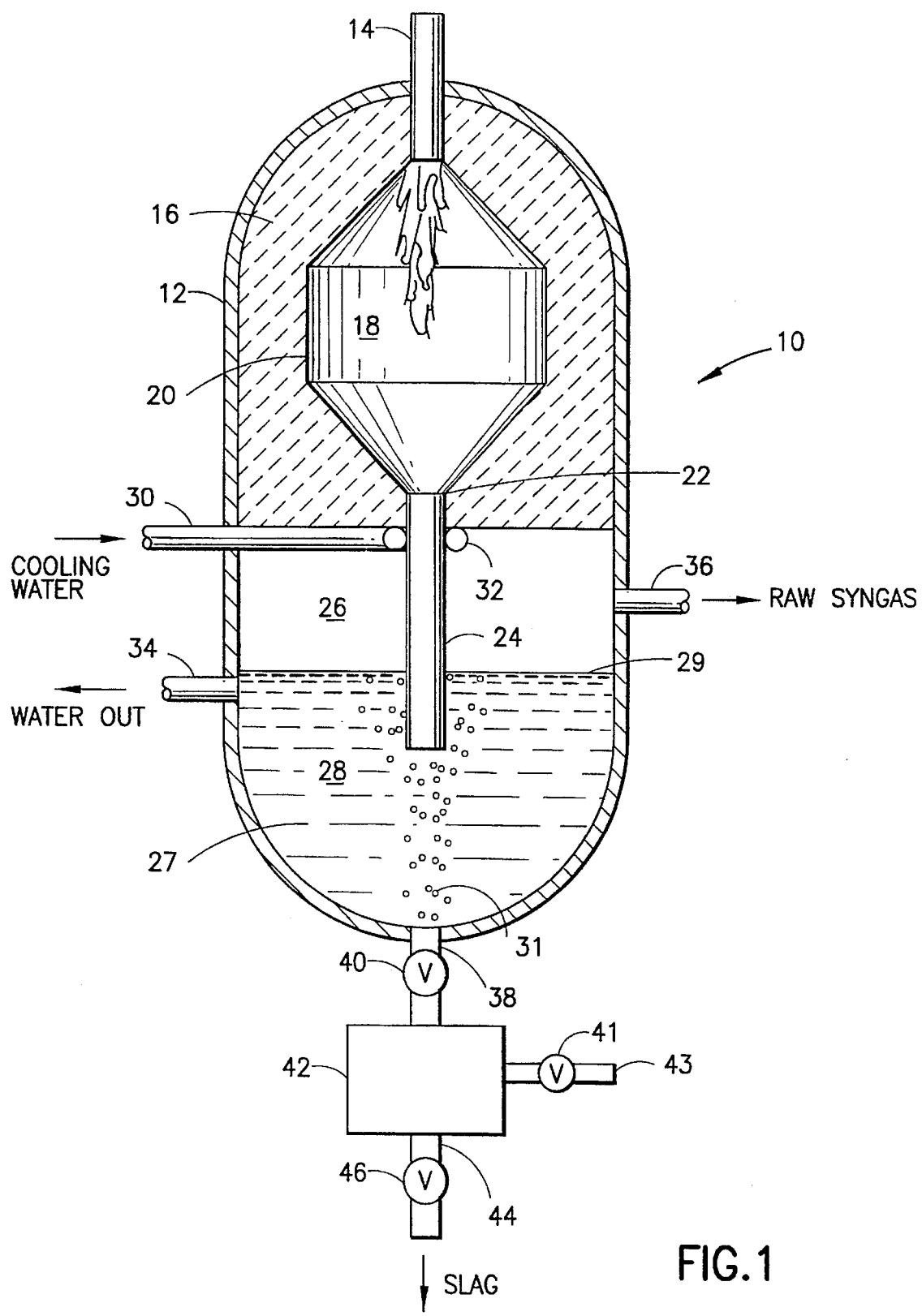
FIG. 1 a simplified diagrammatic representation of a partial oxidation reactor system equipped with a quench chamber.

Many partial oxidation reactor systems include a quench chamber. When slag is removed from the partial oxidation reactor, volatile metals such as lead, zinc, and cadmium condense and solidify in the quench chamber water in the form of finely divided particles having a particle size on the order of about $1 \times 10^8$ meters to $5 \times 10^6$ meters.

The volatile metals can condense and solidify in their elemental form or in the form of carbonates because of high carbon dioxide pressure in the quench water. Other volatile metal compounds can also be formed, such as sulfides. The finely divided condensed volatile metal particles deposit upon or become adsorbed to the surface of the slag byproduct and other particulate residue often found in the quench water such as soot or clarifier bottoms. The condensed volatile metals can also form very fine suspended solids, some of which may agglomerate. Minimal amounts of the volatile metals can also solubilize in the quench water.

A substantial amount of the condensed volatile metals or their carbonates or sulfides can become adsorbed to the surface of the slag in the quench water and not incorporated within the slag. Therefore, the disposal of such slag and other particulate matter with the adsorbed condensed volatile metals can represent a threat to the environment, depending upon the specific volatile metals present and the respective surface concentrations of the adsorbed condensed volatile metals.

In general, the slag will be considered non-hazardous if the contaminants exhibit toxicity characteristics below the regulatory level in milligrams of contaminant per liter of extract, mg/L, as listed in 40 CFR §261.24, Table 1, using the Environmental Protection Agency (EPA) Toxicity Characteristic Leaching Procedure (TCLP), Test Method 1311 in "Test Methods for Evaluation Solid Waste, Physical/Chemical Methods", EPA Publication SW-846. The EPA regulatory level for lead is 5.0 mg/L and for cadmium it is 1.0 mg/L. Although zinc is not currently regulated by the EPA as a contaminant, it is considered a contaminant by many states, and regulated by state law.

State regulations which control the level of contaminants often incorporate the EPA regulatory levels. As noted, state regulations may also control contaminants that are not federally regulated, such as zinc. For example, Title 22 of the California Code of Regulations at §66261.24 sets a Soluble Threshold Limit Concentration (STLC) of 250 mg/L for zinc and/or zinc compounds, and a Total Threshold Limit Concentration (TTLC) of 5000 milligrams per kilogram (mg/kg) for zinc and/or zinc compounds.

The smaller the particle size of the slag particles and other particulate matter that have condensed volatile metals adsorbed thereon, the greater will be the concentration of volatile metal on the basis of mass of volatile metal per mass of slag. Therefore the more finely divided slag particles are more likely to be considered hazardous according to EPA and state regulations. This is because as the particle size of the adsorbent substrate comprising slag or other particulate matter decreases, its surface area per unit mass increases.

In accordance with the present invention, the volatile metals adsorbed on slag particles can be removed by integrating a volatile metals removal operation with the partial oxidation reactor system. The slag removal operation includes an acid washing system and an electrolysis operation to recover the volatile metals that have been adsorbed on the slag particles and other particulate matter associated with a gasification reaction.

The inventive method makes it possible to produce a non-hazardous or "clean" slag from the partial oxidation gasification process when the feed contains high concentrations of volatile heavy metals, and can also make the recovery of the adsorbed volatile metals an economically viable reclaiming operation.

Referring to FIG. 1, a partial oxidation reactor 10 equipped with a quench chamber 26, is provided with a steel shell 12, a burner 14 and refractory material 16 that forms a reaction chamber 18 with wall 20.

The partial oxidation process yields raw syngas, volatile metals and molten slag. Slag is collected on the wall 20 of the chamber 18 and flows downwardly to the bottom of the chamber 18 and out through a constricted throat 22 from which a dip tube 24 extends into the quench chamber 26 that is formed in the lower portion of the reactor. Dip tube 24 extends into a pool of quench water 28 that collects in the quench chamber 26. The raw syngas and volatile metals also exit the reactor through the dip tube 24 and enter the quench chamber 26.

Cooling water enters a line 30 and passes into a quench ring 32 where it flows against the wall of the dip tube 24 into the pool of quench water 28. During the partial oxidation process, the quench water 28 serves to cool the raw syngas, volatile metals and slag, and thereby increases in temperature. A portion of the heated quench water 28 exits through a line 34. The cooling water provided through the line 30 and the portion of heated quench water 28 removed by the line 34 is controlled to maintain a desired level 29 of the quench water 28 in the quench chamber 26.

The raw syngas bubbles 31 rise to that portion of chamber 26 above the water level 29 and are removed through a line 36. The slag (not shown) sinks to the bottom of the quench chamber 26 and exits through a line 38 having a valve 40. The volatile metals condense and solidify as finely divided particles in the quench water in their elemental form or in the form of carbonates, sulfides or other compounds and tend to become adsorbed to the surface of the slag particles, and other particulate substrates in the quench water, such as soot or clarifier bottoms.

Line 38 is connected to slag trap means such as a lockhopper 42 which is connected to a line 44 having a valve 46. During normal operation, the valve 40 is open and the slag and other particulate residue passes through the line 38 and is trapped in the lockhopper 42 when the valve 46 is closed. The accumulated slag is removed from the lockhopper 42 by closing the valve 40, depressurizing the lockhopper through valve 41 and line 43, and opening the valve 46.

Figure 2:
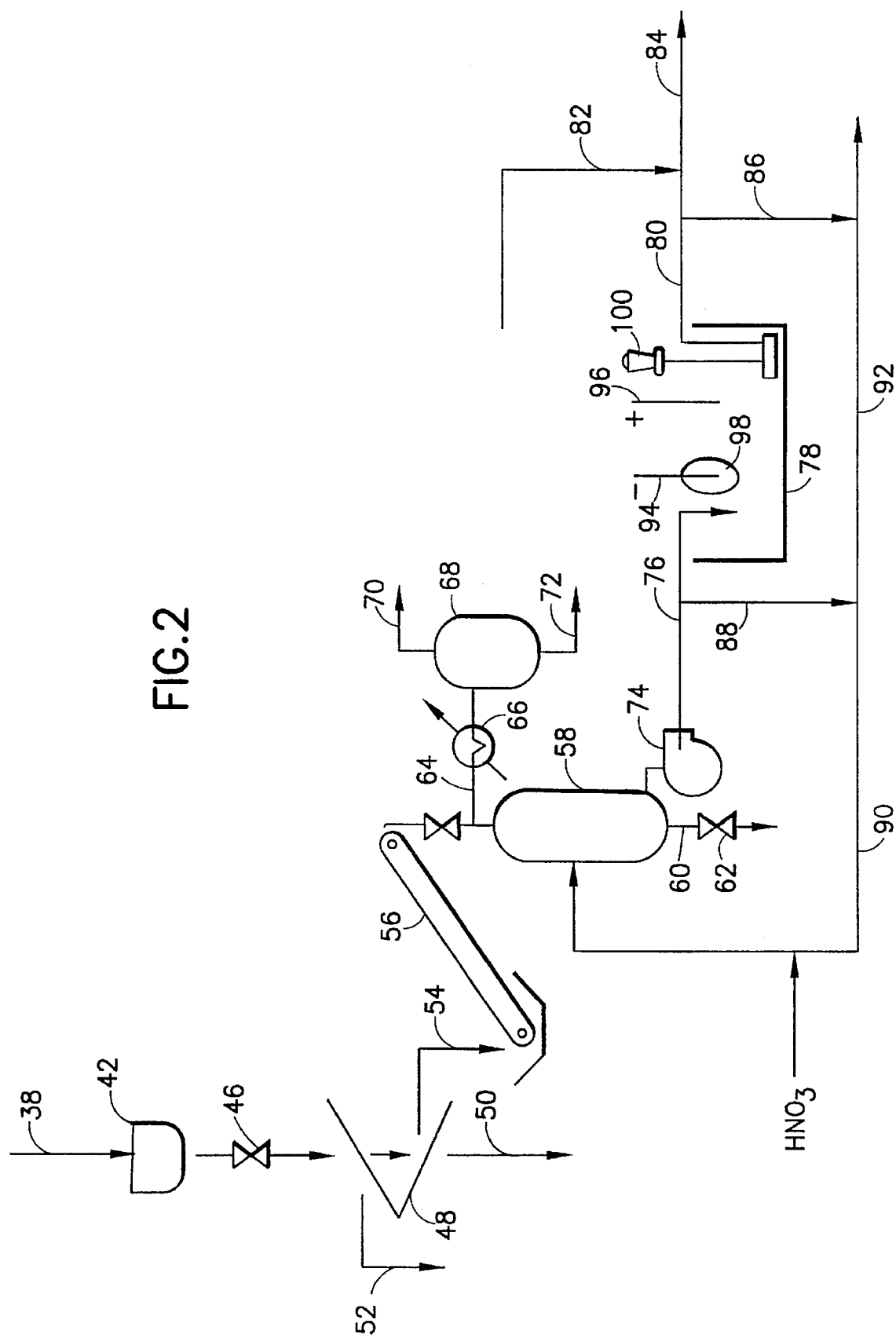
FIG. 2 s a simplified diagrammatic representation of the volatile metals recovery system.

Referring to FIG. 2, the slag stream 38 enters the lockhopper 42 from the quench chamber of a partial oxidation reactor such as that shown in FIG. 1. The lockhopper 42 contains the valve 46 which provides for periodic removal of the slag and other solid particulate material from the lock-hopper. The slag and other particulate material is discharged to a particle size separation system such as a double screen 48 or to a slag receiver/star valve (not shown), or other equivalent system, wherein the hazardous fines having a particle size smaller than about −40 mesh can be separated for further treatment or recycling to the gasifier in stream 50.

The slag and other particulate solids that have a particle size above about +18 mesh can be removed as non-hazardous solids in stream 52. The remaining solids having a particle size ranging from about −18 to +40 mesh are removed in stream 54 and passed to a conveyor system 56 which feeds them into an acid wash tank 58. If desired, the fines having a particle size smaller than about −40 mesh can also be treated in the acid wash tank in the same manner as the −18 to +40 mesh particles.

The −18/+40 mesh particles are contacted in the acid wash tank with a hot dilute mineral acid solution such as nitric, hydrochloric, sulfuric and the like, at a pH of about 0.1 to 2.0 and a temperature of about 180°–240° F. In some instances where there have been large amounts of volatile metals, it becomes desirable to also acid wash the +18 mesh particles that would ordinarily be discharged as non-hazardous. The particles are contacted in the acid wash tank for a sufficient time, such as about 10–60 minutes, to dissolve the volatile metals and convert them to soluble metallic salts corresponding to the mineral acid used in the acid wash tank, thereby forming an acid liquor containing the dissolved volatile metals in the form of soluble salts of the mineral acid and of other anions, such as chlorides, sulfates and nitrates, and a solid residue of the acid washed slag particles, which has been substantially freed of the condensed volatile metals.

The acid washed slag particles of about −18 to +40 mesh exit acid wash tank 58 in stream 60 and pass through valve 62 after which residual acid solution is neutralized as rinsed from the slag using clean water or process condensate from the gasifier process water and gas cooling sections (not shown). Optionally, the acid washed slag particles can be rinsed prior to discharging the solids from the acid wash tank 58. The rinsing medium can be drained from the acid wash tank 58 through a separate line and valve (not shown), where the rinsing medium and residual solids are separated using a particulate barrier, such as a screening system or other similar device (not shown). The rinse solution can be recycled to the gasification or slag washing process or gasifier process water system or treated for disposal. These systems are well known in the art.

Overhead vapors exit the acid wash tank in stream 64 and are cooled by indirect heat exchange in a cooling water heat exchanger 66, and then enter a condenser or knock-out pot 68 wherein the uncondensed vapors exit to a flare or vent in stream 70. Direct contact cooling means can also be used in this operation. Condensed vapor stream 72 passes to a waste water treatment system (not shown), or can be recycled to the gasifier.

The acid liquor that exits from the acid wash tank 58 is pumped through pump 74 and enters as stream 76 into an electrolytic bath 78 for recovery of the volatile metals from the dissolved salts. The acid liquor stream 76 containing the dissolved volatile metal acid salts is electrolyzed with sufficient direct current potential at the cathode 94 to reduce the volatile metal cations to elemental lead 98, zinc or cadmium, which deposit on or coat the cathode and is sent to the reclaimer. Volatile metal compounds such as oxides or sulfides of lead, zinc or cadmium, may also deposit on the anode 96.

Preferably, the electrolysis is conducted under a blanket of syngas from the partial oxidation reactor 10 in FIG. 1. The syngas blanket serves to increase the hydrogen partial pressure over the electrolysis solution and thereby reduces the cell potential and the energy needed per pound of elemental volatile metal that is recovered. Other gas blankets can also be used besides syngas, such as hydrogen or a hydrogen-rich gas, and mixtures of either gas.

The electrical potential at the cathode can vary from about 0 to 5 volts, which is generally sufficient to reduce the zinc, cadmium and lead cations to their respective elemental metal states, depending on the water composition and the reactions taking place in the electrolyte. Typical operating conditions for continuous deposition of the electrolyzer include an operating temperature of about 32°–600° F. preferably about 40°–240° F. and most preferably about 180°–240° F.

The electrodes are periodically removed from the electrolyte and replaced with new anodes and cathodes, as needed. The elemental volatile metals that have deposited on the cathode, or the volatile metal compounds that have deposited on the anode can then be recovered by means well known in the art, such as a suitable smelting or metal reclaiming operation.

Residual slag particles in the electrolyte can also be separated by means well know in the art, such as gravity settling (not shown), and rinsed with water to remove residual acid and salt from the slag particles. The slag can then be discarded without posing an environmental threat, or can be used as construction or road building material. The rinse water can be recycled either to the partial oxidation reactor 10 to serve as cooling water for the quench chamber or to the acid wash tank 58.

After the volatile metal content of the acid washed liquor stream 76 has been reduced to its elemental metal state, the electrolyte stream 80 can then be neutralized with a caustic stream 82 to form neutralized stream 84 that can be sent to a waste water treatment operation (not shown) or recycled to the gasifier 10 in FIG. 1 or recycled to the gasifier process water system.

The present invention also encompasses recycling a portion of the electrolyte stream 80 exiting the electrolysis operation through pump 100 in recycle stream 86 to the acid wash step or to the gasifier 10 in FIG. 1. In addition, a portion of the acid liquor 76 can be recycled in stream 88 to the acid wash tank through fill/recirculation line 90 or be recycled to the gasifier 10 or slurry preparation (not shown) in FIG. 1 through line 92.

Although the recovery of adsorbed condensed volatile metals from slag and other particulate material has been described in the context of a partial oxidation reactor equipped with a quench chamber, the recovery of condensed volatile metals is similarly adaptable to a non-quench gasifier, or to any system wherein an equivalent condensed volatile metal adsorption byproduct is produced.

In a typical non-quench gasifier, the syngas slag and other particulate matter exiting the gasifier is generally indirectly cooled by entering a waste heat boiler. The volatile metals condense and become adsorbed to the slag particles. A separation and collection operation follows wherein the slag particles are removed and recovered, and are then treated in a manner similar to that already described in accordance with the present invention.

What is claimed is:

1. A method for the removal and recovery of volatile metals or compounds thereof adsorbed on the surface of slag particles from a gasification reaction, comprising:

(a) recovering slag particles from a gasification reaction, wherein the slag particles contain condensed volatile metals or compounds thereof adsorbed thereon;

(b) contacting the slag particles containing the adsorbed volatile metals with a mineral acid solution to dissolve the adsorbed volatile metals in the acid solution, and form an acid liquor containing dissolved volatile metal salts in the form of volatile metal cations and anions of the mineral acid, and a residue of acid washed slag particles;

(c) separating the acid washed slag particles from the acid liquor containing the dissolved volatile metal salts to form a substantially particle-free acid liquor;

(d) electrolyzing said particle-free acid liquor to reduce the dissolved volatile metal salt cations to their corresponding metal elements which deposit on a cathode immersed in the acid liquor and thereby form a spent acid liquor that is substantially free of the dissolved volatile metals; and (e) recovering the volatile metals deposited on the cathode from the electrolysis step.

2. The method of claim 1, wherein the volatile metals are recovered from finely divided slag particles containing the condensed volatile metals adsorbed thereon.

3. The method of claim 2, wherein the finely divided slag particles have a particle size of about −18 to +40 mesh.

4. The method of claim 1, wherein the volatile metals comprise at least one metal selected from the group consisting of lead, zinc, cadmium, and mixtures thereof.

5. The method of claim 1(b), wherein the mineral acid solution is comprised of at least one acid selected from the group consisting of nitric acid, hydrochloric acid, sulfuric acid, and mixtures thereof.

6. The method of claim 1(b), wherein the mineral acid solution is at a temperature of about 180°–240° F. and a pH of about 0.1 to 2.

7. The method of claim 6, wherein the slag particles are treated in the mineral acid solution for about 10 to 60 minutes.

8. The method of claim 1, wherein the electrolysis of the volatile metals contained in the acid liquor is conducted under a gas blanket selected from the group consisting of syngas, hydrogen, a hydrogen-rich gas, and mixtures thereof.

9. The method of claim 8, wherein the blanket syngas is obtained from the gasification reaction.

10. The method of claim 1, wherein the acid liquor, substantially freed from the volatile metals by electrolysis, is passed to a waste water treatment operation prior to disposal.

11. The method of claim 1, wherein the spent acid liquor from the electrolysis step is removed and neutralized.

12. The method of claim 10, wherein the spent acid liquor is neutralized with a solution of caustic soda.

13. The method of claim 10, wherein a portion of the spent acid liquor is neutralized and recycled to an extraction step and wherein a portion of the spent acid liquor is recycled to the gasifier.

14. The method of claim 1, wherein the entire spent acid liquor is recycled to the gasifier.

15. The method of claim 1(d), wherein the volatile metals in their elemental state are recovered by removing the cathodes containing the volatile metals deposited thereon.

16. The method of claim 1(d), wherein the volatile metal compounds deposit on the anode and wherein said volatile metal compounds are recovered by removing the anodes containing the volatile metal compounds deposited thereon.

* * * * *